June 11, 1957   D. O. HENDRIX   2,795,164
OPTICAL BEAM SPLITTER
Filed Aug. 25, 1954

INVENTOR.
DON O. HENDRIX
BY

2,795,164
OPTICAL BEAM SPLITTER

Don O. Hendrix, Pasadena, Calif.

Application August 25, 1954, Serial No. 452,002

2 Claims. (Cl. 88—1)

This invention relates generally to optical beam splitters, and a general object of the invention is the provision of optical beam splitters of improved characteristics for various uses.

One well known fault of previously known optical beam splitters is loss of light at the dividing medium. The dividing medium is very often a thin metallic surface of such thickness that it transmits as much light as it reflects. The latest art for producing a beam splitting layer consists in using, instead of a metallic surface, a multiple layered film with the layers composed of materials of alternate high and low index of refraction, all of these layers being transparent. A typical example involves alternate layers of magnesium fluoride and zinc sulphide, the magnesium fluoride being a low coefficient material and the zinc sulphide being a high coefficient material. The advantage of using the multiple layer system is that the absorption of light within the layer is low as compared with the thin metallic layer. However, there is still a serious loss of light, viz., the light transmitted by the beam splitting surface is polarized so that its plane of vibration is in a plane normal to the beam splitting surface. The light reflected by this same surface is polarized in a plane which is perpendicular to the plane of polarization of the transmitted beam. In a common use of the beam splitter, a beam from a source strikes the dividing surface and is split, the reflected portion being lost, or discarded, and the transmitted portion emerging. The emergent beam is then returned along the path of emergence, and strikes the dividing surface, where a portion is transmitted, and lost or discarded, and the other portion reflected and presented to the eye of an observer. The useful portion of light transmitted through the dividing surface in the first instance is polarized in a plane normal to the dividing surface. Upon return to the prism, the useful portion, reflected by the dividing surface, is now polarized in the plane perpendicular to the original plane of polarization. The result is that the larger portion of the returning light is transmitted through the dividing surface and lost, the useful reflected portion, having been subjected to polarization in both planes, being considerably diminished.

An object of the invention, accordingly, is the provision of an optical beam splitter which avoids loss of light by polarization.

In accordance with the invention, this object is attained by the provision of a beam splitter in which the angle of incidence of the beam with respect to the dividing surface is materially reduced. It is known, for example, that polarization increases up to an angle of incidence of 50 or 55°. The beam splitter of the present invention is characterized by a low angle of incidence, e. g., 22½°, giving low polarization, and an important improvement in light conservation.

Another disadvantage in beam splitters known heretofore when used in the manner indicated above is the awkward angle at which the beam is presented to the eye—usually at 90° to the return beam. I have found that a 45° presentation of the beam is much more desirable for viewing with the eye. This is because the operator can look at a 45° angle more easily than, for instance, straight down or straight up or even horizontally into an eyepiece. A further advantage is that the separation between the light source or beam to be separated and the returned beam is in this instance 135° instead of 90°. This allows for a greater separation between the light source and the eye. The use of the standard type of beam splitter versus the subject type in the manufacture of optical instruments has shown that the convenience and comfort of the operator using the instrument very materially affects the accuracy with which he makes readings.

A further object is accordingly the provision of a beam splitter having an improved viewing angle such as indicated.

In another illustrative use of the beam splitter, a single beam of light is separated into two beams which pass through different paths. These two beams may then return to the same beam splitter for reuniting into a single beam. A unique feature of the beam splitter of the invention is that, in its preferred form, the optical paths through the glass for such two beams beyond the plane of the dividing surface are precisely equal in length, and it is one important object of the invention to provide such a beam splitter. The advantage of this feature is that the two beams pass through the splitter without phase shift, as is of advantage in many optical instruments.

The invention will be best understood by now referring to the following detailed description of a beam splitter according to the invention, reference being had to the accompanying drawings, in which.

Figure 1:
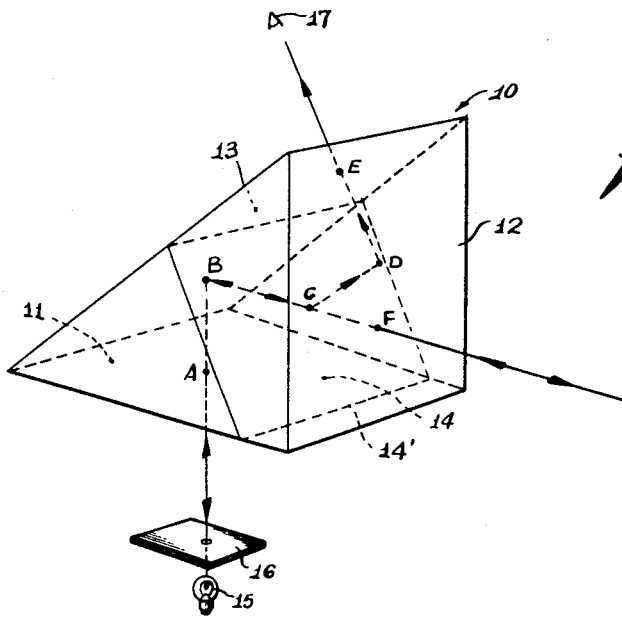
Fig. 1 is a perspective view of a preferred embodiment of the invention.

Referring to Fig. 1, there is shown an optical beam splitter in the form of a solid prism 10 having optically flat faces 11 and at right angles to one another, and an optically flat face 13 making angles of 45° with each of the faces 11 and 12.

Located internally within the prism 10 is an optically flat dividing surface 14, preferably with one or more coatings of materials consisting of a multiple layered film, with alternate layers having different refractive indices. Such a dividing surface is known in the art. Preferably, for a 45°–45°–90° optical prism, as shown, the surface 14 is inclined at an angle of 67½° with respect to the face 11 and intercepts the face 11 in a line dividing the base line of the face in ratio $$1:\frac{\sqrt{2}-1}{2}$$

I have discovered that with this relationship, a light path ABC whose portion AB between faces 11 and 13 is normal to face 11 and whose portion BC between face 13 and dividing plane 14 is at right angles to portion AB (and also normal to face 12), is precisely equal to the light path CDE whose portions CD and DE make 45° angles of incidence with face 12, portion DE being normal to face 13.

In describing one use of the optical prism 10 as a beam splitter, wherein the feature described in the preceding paragraph is of prime importance, the light source 15, pin hole plate 16, and viewer's eye 17 as shown in Fig. 1 are to be disregarded.

Consider a light beam, preferably collimated, entering normal to the face 12 as at the point F. This beam will strike the 67½° internal dividing surface 14 at C at an angle of incidence of 22½°, and will be split into two beams, a first beam being reflected so as to travel from C to D, and thence internally reflected from D on face 12 to E where it leaves the splitter as shown. The second beam passes through surface 14 at C and goes on to point B on face 13, is internally reflected from face 13 at B, and passes vertically down and out of surface 11 at A. Since the optical path CDE is equal to the optical path CBA, the beams leaving faces 13 and 11, respectively, are in phase, and no compensating adjustments in apparatus employing the beam splitter need be effected. Moreover, the reflected portion of the beam from point C will not be appreciably polarized since its angle of incidence on the surface 14 (22½°) is small.

Assume next a use of the prism as shown in Fig. 1 employing a source of light 15, preferably monochromatic, disposed below surface 11 and a pin hole plate 16 interposed between light 15 and surface 11 to simulate a point source. An operator may conveniently view the effects of various other optical pieces to be tested, or other phenomenon (not shown) from a position 17.

In use, light from source 15 through pin hole 16 passes along the path ABCF and out through surface 12 to apparatus to be tested. It will be seen that a useful portion of this light has been transmitted through dividing surface 14; an unused portion is reflected downward at C by surface 14, and is lost. The light beam is returned along the same external path so that it enters the face 12 at F and strikes internal dividing surface 14 at C. A useful portion of this beam is reflected from C back to face 12 at D, where it is totally reflected to pass out face 13 at E to the viewer's eye 17. The portion of the returning beam transmitted through surface 14 at C is useless in this application, and lost. Attention is now directed to the fact that the initial or outwardly travelling beam, in the portion BC of its travel, strikes dividing surface 14 at a small angle of incidence, in this case 22½°. The plane polarization of the beam transmitted through surface 14 (taking place in the plane normal to surface 14) is not great for this angle. Also, the return beam, travelling from F to C, strikes dividing surface 14 at the same low angle of incidence (22½°), and suffers only small plane polarization in the other direction (in the plane of surface 14) upon reflection by surface 14. The reduced polarization results in materially reduced loss of light, a large portion of the returning beam being reflected by the dividing surface to be sent out along path CDE to the observer's eye at 17.

Figure 2:
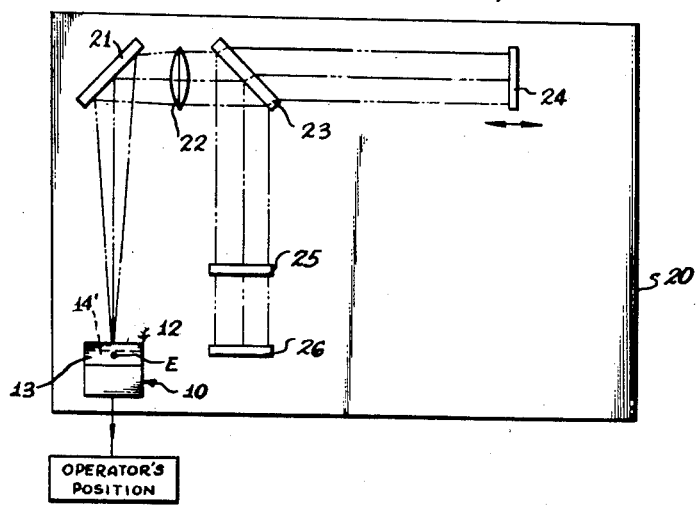
Fig. 2 shows, in schematic plan form, the beam splitter of the invention as employed in one form of optical apparatus.

Fig. 2 illustrates in plan view one advantageous application of the optical piece 10 of Fig. 1 as employed in an interferometer. In Fig. 2 the interferometer is mounted on a horizontal slab 20 and includes the prism 10 of Fig. 1 with its vertical face 12 normal to the surface of the slab as shown. The light source 15 and pin hole plate 16 will be understood to be located under the slab, a suitable opening (not shown) being provided in the slab, permitting light to enter the optical piece 10 at its bottom surface 11. Alternatively, the prism 10 may be mounted just off the front edge of slab 20 to expose the bottom surface of the prism to a suitable light source.

With this arrangement, a light beam from the source will pass normally out of surface 12 to a reflecting mirror 21, and thence through collimating lens 22 and dividing mirror 23, here shown to be of conventional type. The beam is thus split into two paths, one proceeding through dividing mirror 23 to an adjustable mirror 24 where it is totally reflected back, and the other path reflected downwardly through apparatus 25 to be tested, to a mirror 26 and back up to the dividing mirror 23 where it is recombined with the beam traversing the first path. The recombined beam then passes back through the collimating lens 22, reflects off mirror 21, and enters the light splitter 10 through its surface 12, a portion of the returned beam being internally reflected at plane 14 to pass out of face 13 at E, at a convenient viewing angle of 45° to horizontal, as explained in connection with Fig. 1.

Attention is again directed to the fact that the internal surface 14 (Fig. 1) receives the light beams in each instance at a low angle of incidence of substantially 22½°, in distinction to the usual type beam splitters wherein this angle is materially greater. This small angle of incidence, as earlier set forth, reduces polarization of the light beam by a substantial degree, thereby materially improving the transmission characteristics of the splitter. Moreover, the arrangement is such as to permit the operator to view with great convenience the effects of the apparatus 25 (Fig. 2) on the light beam, since the observed beam from E on face 13 of the splitter 10 is directed upwardly at a natural angle of substantially 45° with respect to horizontal.

Finally, the fact that the optical path lengths ABC and CDE in the beam splitter 10 are identical, as explained above, means that when the splitter is employed to split a beam entering through face 12 into two beams, or to recombine two beams entering through the two faces 11 and 13 into a single beam emergent through face 12, no phase shift or interference will be introduced by the prism 10. It will be further seen that this advantage can be realized, illustratively, if the beam splitter of the invention is substituted for the dividing mirror 23 in the interferometer of Fig. 2.

Other uses for the optical beam splitter of this invention will readily occur to those skilled in the art. The invention is not to be thought of as limited in application only to an interferometer, which application has been given merely by way of example.

I claim:

1. An optical light splitter comprising a reflecting prism having angles of substantially 45°–45°–90° providing two faces at right angles to one another and a hypotenuse face, and an internal plane light dividing surface in said prism intersecting one of said two faces near the juncture of the latter with the other of said two faces, said dividing surface being inclined away from the other of said two faces to a line of intersection with said hypotenuse face on an angle of substantially 67½° relative to said one face.

2. The subject matter of claim 1, in which the light dividing surface intersects said one face in such a position as to divide said face in the ratio of $$1:\frac{\sqrt{2}-1}{2}$$

References Cited in the file of this patent

UNITED STATES PATENTS 1,497,356    Comstock              June 10, 1924